United States Patent
Lee et al.

(10) Patent No.: US 7,085,402 B2
(45) Date of Patent: *Aug. 1, 2006

(54) METHOD OF DETECTING A SPECIFIC OBJECT IN AN IMAGE SIGNAL

(75) Inventors: Jin Soo Lee, Seoul (KR); Hyeon Jun Kim, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 131 days.

This patent is subject to a terminal disclaimer.

(21) Appl. No.: 10/655,311

(22) Filed: Sep. 5, 2003

(65) Prior Publication Data

US 2004/0047494 A1    Mar. 11, 2004

Related U.S. Application Data

(62) Division of application No. 09/480,111, filed on Jan. 10, 2000, now Pat. No. 6,639,998.

(30) Foreign Application Priority Data

| Jan. 11, 1999 | (KR) | 1999-425 |
| Jan. 22, 1999 | (KR) | 1999-2016 |
| Feb. 9, 1999 | (KR) | 1999-4358 |

(51) Int. Cl.
   *G06K 9/00*    (2006.01)

(52) U.S. Cl. .................. 382/103; 382/195; 382/209

(58) Field of Classification Search ............ 382/103, 382/107, 162, 165, 190, 195, 209; 348/135, 348/155

See application file for complete search history.

(56) References Cited

U.S. PATENT DOCUMENTS

| 5,912,980 A | 6/1999 | Hunke .................. 382/103 |
| 6,141,434 A | 10/2000 | Christian et al. ........ 382/103 |
| 6,263,113 B1 | 7/2001 | Abdel-Mottaleb et al. .. 382/118 |
| 6,292,575 B1 | 9/2001 | Bortolussi et al. ....... 382/118 |
| 6,639,998 B1 * | 10/2003 | Lee et al. .............. 382/103 |

* cited by examiner

*Primary Examiner*—Phuoc Tran
(74) *Attorney, Agent, or Firm*—Fleshner & Kim, LLP

(57) ABSTRACT

A method of detecting a specific object in an image signal both efficiently and accurately is disclosed. According to the method, an object is first detected from an image or frame using a general feature of the object and in the following image or frame, the object is detected using an object-dependant feature. Also, when detecting a plurality of objects or portions of the object, a full color range of the specific object is determined, and color range sections of the full color range is used to detect the object.

24 Claims, 16 Drawing Sheets window position

METHOD OF DETECTING A SPECIFIC OBJECT IN AN IMAGE SIGNAL

This application is a Divisional of application Ser. No. 09/480,111 filed Jan. 10, 2000, now U. S. Pat. No. 6,639,998.

BACKGROUND OF THE INVENTION

1. Field of the Invention

The present invention relates to a method of detecting a specific object in an image signal and particularly to a method of detecting a face of a character in a moving picture file.

2. Background of the Related Art

Recently, technology for digital image signal processing has been greatly developed and has been applied in various fields. For example, the digital image signal processing technology may be used in a search system for automatically editing only the face of a specific character in a moving picture file of a movie or drama, or in a security system for permitting access to only persons registered in the system. The performance of such systems basically depend on the accuracy and speed of the detecting a desired object. Accordingly, various methods of detecting a desired object have been proposed in the related art.

In "*Pedestrian Detection Using Wavelet Templates*", CVPR97, June 17–19, MIT, a face is detected by using predetermined face templates of a plurality of characters, templates for each character ranging from a minimum size to a maximum size. When the image signal is input to the system, the frames are scanned and matched with the face templates of various size and character to detect the face. As a result, a great number of template matching may be required, thereby increasing the processing time for detecting a desired object.

In "*Automatic Extraction of Face from Color Reversal Film using Statistical Multistep Technique*", ACCV '95 Second Asian Conference on Computer Vision, December 5–8, a method of detecting the face region of a character in a still image has been proposed. According to this face detecting method, the values expressed in the RGB (red, green, blue) color space are converted to the HSV (hue, saturation, value) color space, and the pixels representing a skin color are detected. Thereafter, segmentation of the detected skin color region is performed using an edge detection, hole filling, and gap filling operation. Thus, a final face region is detected by identifying the face region of a desired character using patterns prepared for estimating the detected region.

However, the relative accuracy of face detection is lower in comparison to other face detection methods because a still image is used which requires less information than the moving image. Also, this method utilizes only skin color information in detecting the face region, but such skin color information may changes according to the ethnic origin and circumstances such as the illumination, background, or makeup state of the character. Moreover, since the method requires the conversion from the RGB to the HSV color space, more processing time is required in detecting the face region.

Furthermore, a face region detection method using object-dependent skin color information is described in "*Extraction of facial regions features using color and shape information*", Karin Sobotta, pp 421–425 ICPR '96. However, the face region detection using only the skin color information is not as reliable. As discussed above, since the skin color information may change according to ethnic origin as well as circumstances, it is very difficult to pre-define the range of the skin color values.

Other detection methods include automatically detecting the face region of a character if the character moves on a screen of a video camera and then identifying the character if the detected face has been registered. According to this type of face detection, the whole movement of a character is detected using image difference, and the face of the character is identified using the nervous system. Movements caught by the image difference may include movements of parts such as the body, arms or legs rather than the face, or noises belonging to the background. Thus, accuracy may not be high in detecting the face region from the image which moves as a whole. Also, in case of fast movement of a character, a significant time would be required to detect the face region.

SUMMARY OF THE INVENTION

Accordingly, an object of the present invention is to solve at least the problems and disadvantages of the related art.

An object of the present invention is to provide a method of detecting a specific object in an image signal both accurately and rapidly.

Another object of the present invention is to provide a method of detecting a face in an image signal both accurately and rapidly.

Still another object of the present invention is to provide a method of detecting a specific object or partial regions of the specific object in an image signal.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, the method of detecting a specific object in an image signal comprises detecting the specific object from a first input image frame using a general feature of the object, performing an adaptive study with respect to additional information which depends on the detected object, and detecting a final object from the following input image frames by applying the additional feature to the object detected using the general feature.

In another aspect of the present invention, a method of detecting a specific object in an image signal comprises detecting the specific object from an input image frame using a detection algorithm, performing a template matching n times within a limited effective range based on the detected object, and detecting a final object using the results of the template matching.

In still another aspect of the present invention, a method of detecting a specific object in an image signal comprises dividing a color range (W) of the object included in an input image signal into a plurality of level sections, detecting color images which satisfy a color range condition of the divided level sections with respect to the image frame, and detecting and confirming the object from the detected color images using a confirmation algorithm.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Reference will now be made in detail to the preferred embodiments of the present invention, examples of which are illustrated in the accompanying drawings.

Figure 1:
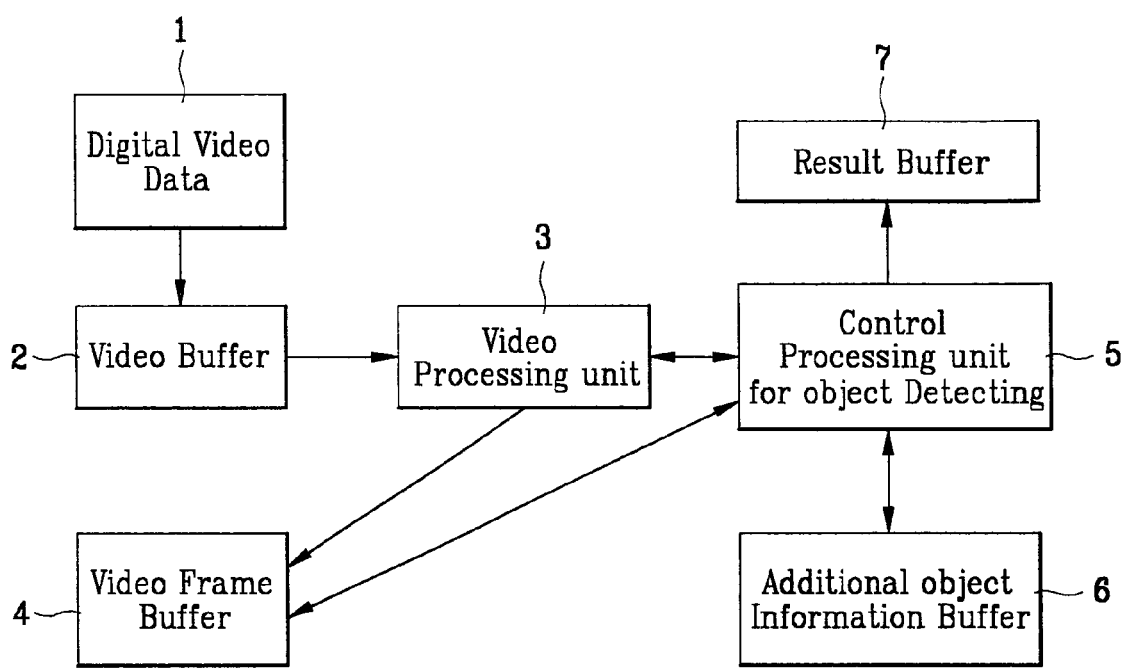
FIG. 1 is a block diagram of a detection system for detecting a specific object in an image signal according to the present invention.

FIG. 1 is a block diagram of a detection system for detecting a specific object in an image signal according to the present invention. The detection system includes a video buffer 2 which temporarily stores input digital video data 1; a video processing unit 3 which processes the digital video data 1 stored in the video buffer 2 with a file of a multimedia video stream; a control processing unit (CPU) 5 which produces information required in the video stream file processed by the video processing unit 3; a video frame buffer 4 which stores a signal output from the control processing unit 5, i.e. a frame for object detection; an additional object information buffer 6 which stores feature values which are additionally stored by an object-dependant feature learning processed by the control processing unit 5; and a result buffer 7 which stores a finally detected object.

Figure 2:
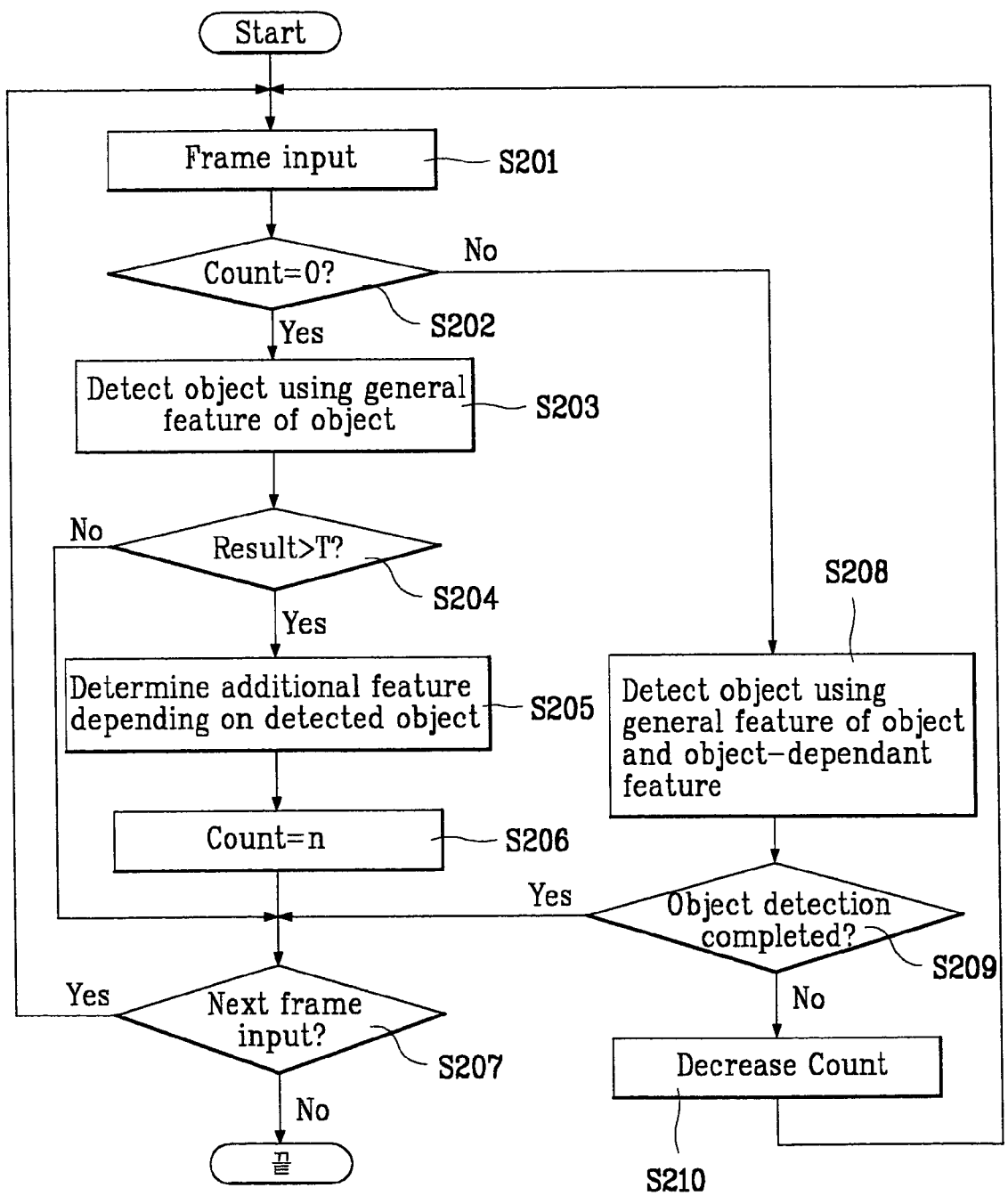
FIG. 2 is a flowchart of an adaptive object detection process by an object-dependant feature study according to a first embodiment of the present invention.

FIG. 2 is a flowchart of an object detection process by an object-dependant feature learning according to a first embodiment of the present invention. Referring to FIG. 2, if a moving image or still image is sequentially inputted (step S201), the detection system judges whether the present state is an initial state by checking a current count value (step S202). That is, if the count value is "0," the detection system recognizes the present state as the initial state, and detects the object from the input image frame using a general feature (step S203).

Thereafter, the detection system compares the result of the detected object with a predetermined threshold value (step S204). If the result exceeds the threshold value, the detection system judges that the object is accurately detected to a certain extent and learns an object-dependant feature in the detected object region. Such a learning process may be performed with respect to an object-dependant information such as a color information, shape information or motion information using a current input image frame, or may be performed using several sequential image frames. Accordingly, the detection system determines a range of corresponding object-dependant feature values (step S205). However, if the result in step S204 does not exceed the threshold value, the detection system performs the detection operation for the following input image frames.

When a range of object-dependant feature values is determined as above, the detection system determines the count value as n, where n>"0," in order to indicate that the system has obtained the object-dependant information (step S206). Thus, after the detection system obtains the object-dependant information, the count value is set to be greater than "0," such that the detection system detects the object from the next input frame using the values of the general feature and the object-dependant feature.

Accordingly, if the count value is not "0" in step S202, the detection system detects the object from an input image using the object-dependant feature value only, or using both the values of the general feature and the object-dependant feature (step S208). Thereafter, the detection system judges whether all objects are detected and confirmed successfully (step S209). If it is judged that all objects are detected and confirmed successfully, the detection system performs the object detection using the values of the general feature and the object-dependant feature as described above for the next frames (step S207). On the other hand, if the system judges that at least one object is not detected and/or confirmed, the detection system decreases the count value (step S210). Thereafter, if the object detection using the object-dependant additional feature value fails n times, the detection system judges that an object having the feature no longer exists and returns the count value of n to the initial state of "0." Here, the value of n is determined by an operator depending upon the needs of the system.

In the detection process, the system may be reset to the initial state when a shot change of the input frame is detected, thereby the object detection is performed using the values of the general feature. Because information of the object, which may change depending upon circumstances such as the illumination, background or makeup state of the character, is assumed to be maintained during a same shot, a shot change would change the object information and thus require a new object detection. Accordingly, the detection process may be determined so that the information on the shot is included in the image frame, and the detection system automatically detects the shot information.

Figure 3:
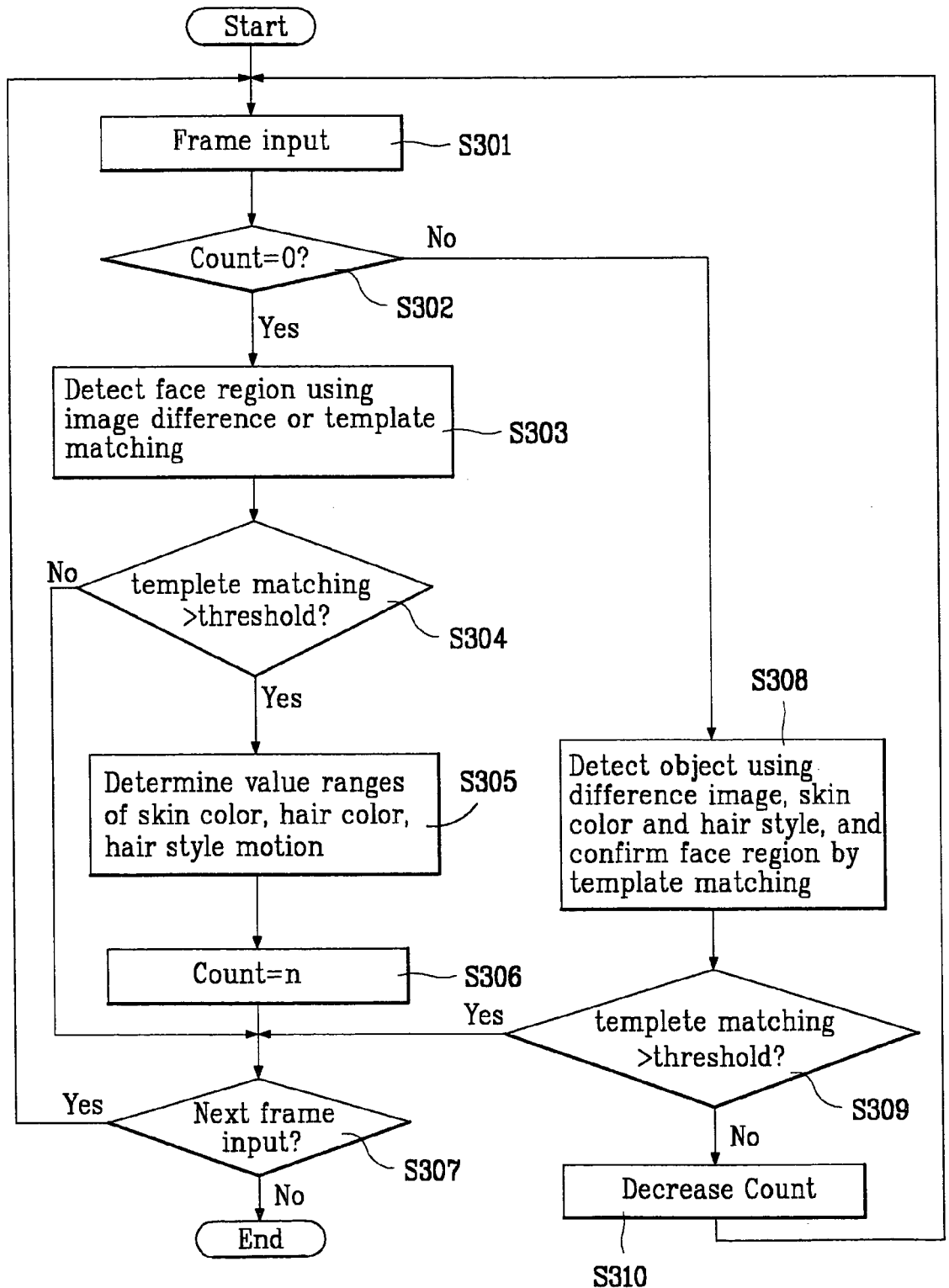
FIG. 3 is a flowchart of an adaptive face detection process by an object-dependant feature study according to the first embodiment of the present invention.

FIG. 3 illustrates the object detection process according to the first embodiment of the present invention when the object to be detected is a face.

Referring to FIG. 3, if a frame of a moving image or still image including a face to be detected is input (step S301), the detection system judges the present state by checking the count value. If the count value is "0," meaning that the present state is an initial state, the detection system detects a desired face region using a general feature such as an image difference or template matching (steps S302–S303). Thereafter, if face region is judged to be accurately detected to a certain extent using the general feature, the system defines an additional feature such as a skin color of the face, hair color, hair style or motion information, which depends on the corresponding face in the detected face region, or redefines a range of the general feature value used (step S305). Specifically, the detection system compares the point of the template matching with a predetermined threshold value. If the template matching point exceeds the threshold value, the detection system judges that a face is detected, and detects the face region in the following input image frame using the object-dependant additional feature or using both the general feature and the object-dependant feature (step S307).

In the present embodiment, different types of general features and/or object-dependant features may be used. Moreover, one feature of the same type may be used as the general feature information and the object-dependant feature information by defining a range of their values. For instance, the detection system may define as a general feature information an extensive skin color condition which includes all face skin color range appearing irrespective of the image when detecting the face object, and detect the face object using the defined general feature. Then, the detection system may define a narrow face skin color condition which depends on the detected face as the object-dependant feature information.

After defining the additional feature, the detection system sets the count value to n which is greater than "0" in order to indicate that the object-dependant information has been obtained (step S306). Subsequently, the detection system detects the face object using the values of the general feature and the defined object-dependant additional feature, and confirms the detected face region by a template matching (step S308). The detection system then judges whether the detection of the face region is complete by comparing the point of a template matching with a predetermined value (step S309). If the template matching point does not exceed the threshold value, the detection system decreases the count value (step S310).

According to the first embodiment of the present invention as described above, the object detection is performed using the general feature with respect to the first frame among the sequentially input image frames. Also, an object-dependent feature and range of the object-dependant feature is determined from the detected object region. Thus, an object-dependent information is utilized as an additional information to efficiently detect a specific object.

Figure 4:
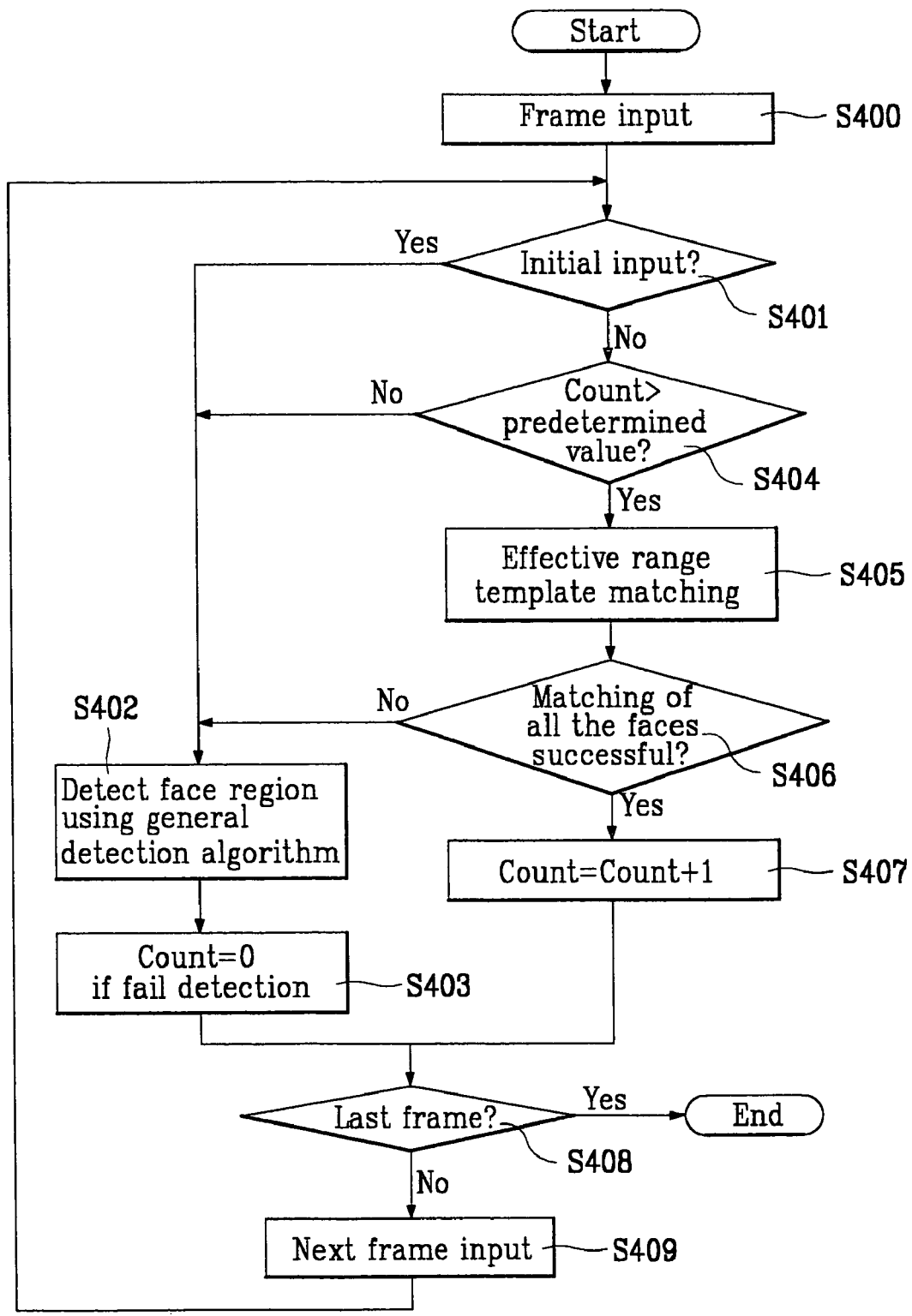
FIG. 4 is a flowchart of a specific object detection process using a template matching based on a condition of an effective range according to a second embodiment of the present invention.

FIG. 4 is a flowchart of a specific object detection process using a template matching based on an effective range condition according to the second embodiment of the present invention. For purposes of explanation, a human face will be assumed to be an object to be detected.

In the second embodiment, when image frames are input (step S400), the detection system judges whether the current input frame is the first frame (step S401). If the current input image frame is the first frame, the detection system detects an initial face region from the current input frame using a general detection algorithm described in the related art (step S402). However, if the system fails to detect an initial face region, the count value is set to "0" (step S403). The detection system then judges whether the current frame is the last frame (step S408) and if the current frame is the last frame, the detection operation is terminated. Otherwise, a following frame is input and the system returns to step S401 (step S409).

Particularly, the initial face region may be detected by a template matching method using the current image frame or a method using an image difference and skin color information. In the template matching method, a size of a predefined template may be varied within a predetermined range. By scanning from a small image region to a large image region with the predefined template of a corresponding size, the face regions of characters can be detected using one frame, i.e. the current image frame. In contrast, the method using the image difference and skin color information detects a motion by obtaining a difference between two frames, i.e. the image difference which is also an image. Thereafter, a region of the motion detected region with a characteristic of the face, such as a color belonging to the skin color range, is determined as a face region.

Referring back to step S401, if the current input frame is not the first frame, the detection system compares the current count value with a value predetermined by the system (step S404). If the current count value exceeds the predetermined value, the detection system performs a face region detection based upon the face regions detected from a previous frame in step S402 (step S405). On the other hand, if the current count value does not exceed the predetermined value, the detection system detects the face region from the current input frame using the general detection algorithm (step S402).

Figure 6:
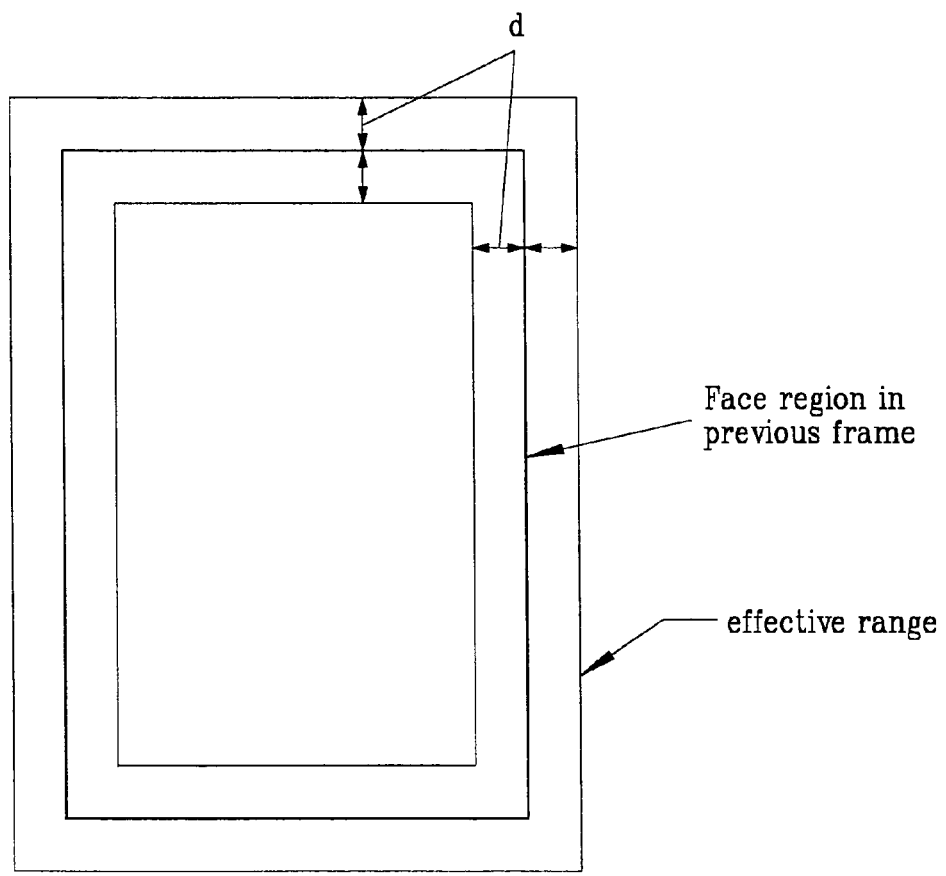
FIG. 6 is a view explaining the determination of the effective range value according to the second embodiment of the present invention.
Figure 7A:
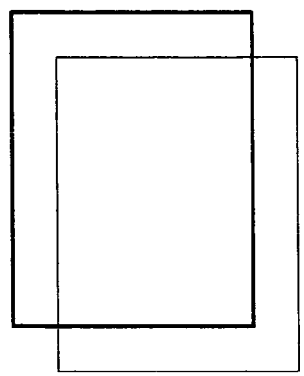
FIGS. 7A to 7I are views explaining types of simple movement matching in 9 directions according to the second embodiment of the present invention.
Figure 7B:
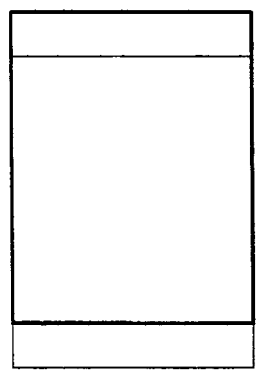
Figure 7C:
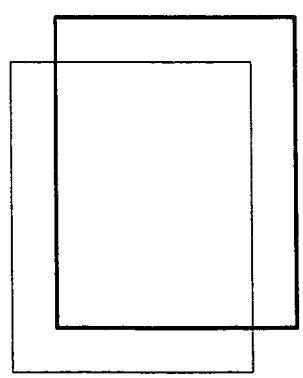
Figure 7D:
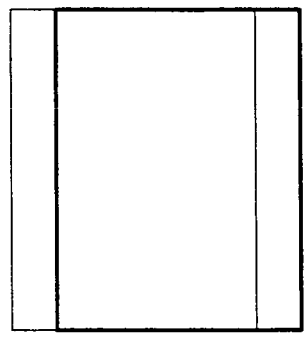
Figure 7E:
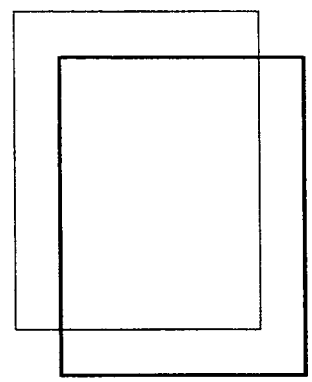
Figure 7F:
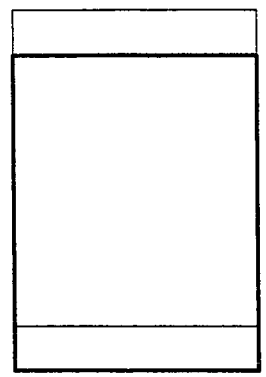
Figure 7G:
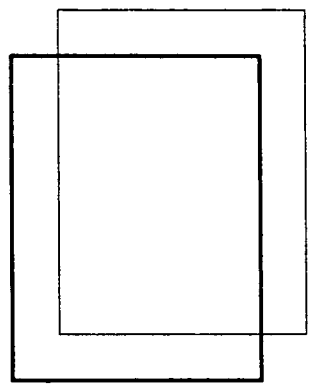
Figure 7H:
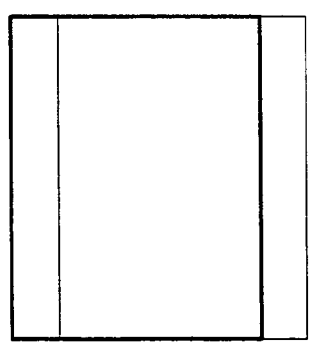
Figure 7I:
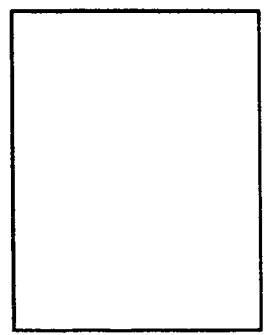
Figure 8J:
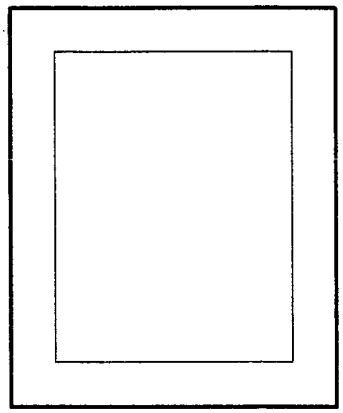
FIGS. 8J to 8S are views explaining types of scale movement matching in 10 directions according to the second embodiment of the present invention.
Figure 8K:
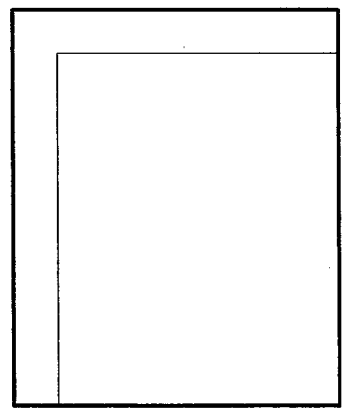
Figure 8L:
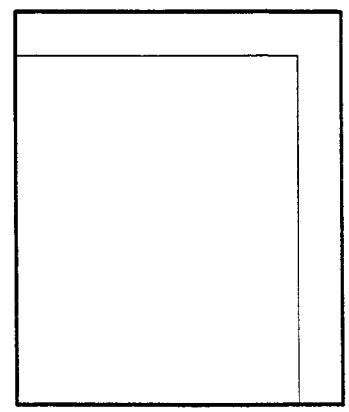
Figure 8M:
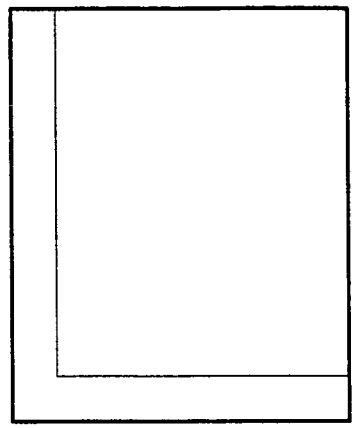
Figure 8N:
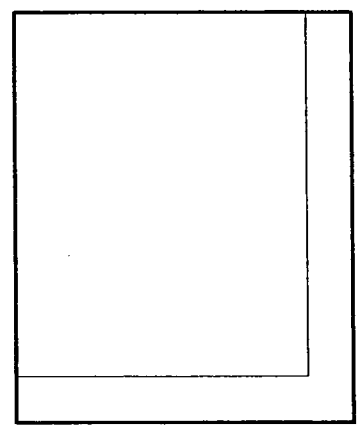
Figure 8O:
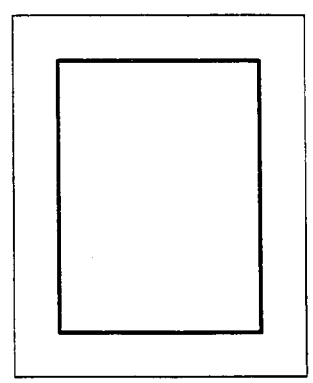
Figure 8P:
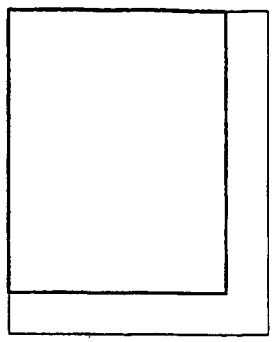
Figure 8Q:
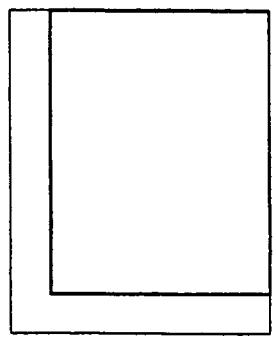
Figure 8R:
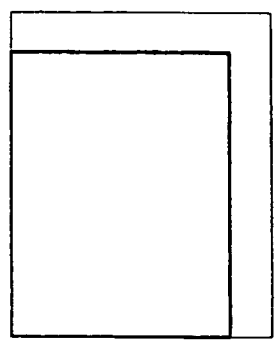
Figure 8S:
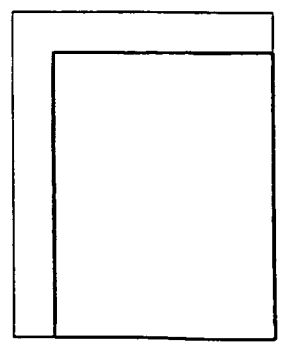

In step S405, the face detection is performed by a template matching based on an effective range condition with respect to one or more face regions detected in step S402. The effective range is defined as the estimated range where a face region may appear in the next frame. Particularly, the effective range is obtained using a maximum range where a face may move within a time interval of the image frames and is defined for each face region appearing in an image. Also, the maximum effective range means a range extended as much as a movable distance (d) in all directions from the original detected face region as shown in FIG. 6. The maximum effective range is defined as a maximum distance (d) that the original face region may be extended without affecting the detection of a face when the original face region is shifted by a distance of d/2. If the movable distance (d) is determined, the time interval (Δt) between the frames is given by the following equation [1], where v means the movable speed.

$$\Delta t = \frac{d(\text{sec})}{v(\text{pixel/sec})} \qquad [1]$$

The value of v is determined as the maximum speed of the face region movement which is detected using a prepared data. Thus, the maximum movable distance of a face region which may occur between two frames is determined to be shorter than the distance (d). Also, the distance (d) has no relation to the template size.

The template matching based upon the effective range according to the second embodiment of the present invention may use a shift matching where the original image is simply shifted in a predetermined direction, a scale matching where the original image is enlarged or reduced in a predetermined direction, or a combination of the shift matching and the scale matching. FIGS. 7A to 7I illustrate a shift matching and 8J to 8S illustrate a scale matching, where the thin solid lines indicate the original image and the thick solid lines indicate the image shifted or scaled by the template matching.

Particularly, the shift matching method may be classified into either a four-directional matching method as represented by FIGS. 7B, 7D, 7F, 7H and 7I or an eight-directional matching method as represented by FIGS. 7A to 7I. The scale matching method may also be classified into an enlarged scale matching method as represented by FIGS. 8J to 8N and a reduced scale matching method as represented by FIGS. 8O to 8S. Although FIG. 7 show only 9 cases for shift matching and FIG. 8 show only 10 cases for scale matching, the present invention is not limited to the illustrated cases and may be shifted or scaled in more or less directions, depending upon a required accuracy. For example, if an eight-directional shift and scale matching method is utilized to search a face region, 19 cases would occur, while if a four-directional shift and scale matching method is performed, 15 cases would occur.

Moreover, the effective range template matching method according to the second embodiment of the present invention may be classified into a whole matching method in which template matching is performed in 19 cases shown in FIGS. 7 and 8 to determine the matched region having the highest point as the final face region, a motion estimation matching method in which a face region is estimated based on the motion of the previous face region, and a speed estimation matching method in which a final face region is detected using a relative speed difference of face motion appearing in the frame during a defined time interval ($\Delta t$) between two frames. Furthermore, the matching may be performed in consideration of both the motion and the speed simultaneously.

In the motion estimation method, the probability of movements in one of the matching types shown in FIG. 7 or FIG. 8 is predicted and a template matching is performed in the order from the highest to lowest probability of predicted matching types. Once a template matching point exceeds a predetermined threshold value, the matching is terminated and the corresponding matched region is judged as the face region. This method allows a high speed detection because the number of required matching is relatively low.

The highest probability of matching type is determined in consideration of a previous matching type and a similarity distance as shown in Table [1] below. Here, the matching type represents the motion of the face and the previous matching type represents the motion of the face region in the previous detection. Namely, assuming that a motion of face continues, there is a high probability that the motion would be in the same direction.

TABLE 1

|   | a) | b) | c) | d) | e) | f) | g) | h) | i) | j) | k) | l) | m) | n) | o) | p) | q) | r) | s) |
|---|---|---|---|---|---|---|---|---|---|---|---|---|---|---|---|---|---|---|---|
| a) | 0 | 1 | 2 | 2.5 | 3 | 2.5 | 2 | 1 | 1.5 | 5 | 4 | 6 | 7 | 8 | 5 | 4 | 6 | 7 | 8 |
| b) | 1 | 0 | 1 | 1.5 | 2.5 | 2 | 2.5 | 1.5 | 1 | 4 | 3 | 3 | 5 | 5 | 4 | 3 | 3 | 5 | 5 |
| c) | 2 | 1 | 0 | 1.5 | 2 | 2.5 | 3 | 2.5 | 1.5 | 5 | 6 | 4 | 7 | 6 | 5 | 6 | 4 | 7 | 6 |
| d) | 2.5 | 1.5 | 1.5 | 0 | 1 | 1.5 | 3 | 2 | 1 | 6 | 4 | 5 | 4 | 5 | 6 | 4 | 5 | 4 | 5 |
| e) | 3 | 2.5 | 2 | 1 | 0 | 1 | 2 | 2.5 | 1.5 | 7 | 6 | 6 | 5 | 4 | 7 | 6 | 6 | 5 | 4 |
| f) | 2.5 | 2 | 2.5 | 1.5 | 1 | 0 | 1 | 1.5 | 1 | 5 | 6 | 6 | 4 | 4 | 5 | 6 | 6 | 4 | 4 |
| g) | 2 | 2.5 | 3 | 3 | 2 | 1 | 0 | 1 | 1.5 | 6 | 5 | 8 | 4 | 7 | 6 | 5 | 8 | 4 | 7 |
| h) | 1 | 1.5 | 2.5 | 2 | 2.5 | 1.5 | 1 | 0 | 1 | 5 | 4 | 6 | 4 | 6 | 5 | 4 | 6 | 4 | 6 |
| i) | 1.5 | 1 | 1.5 | 1 | 1.5 | 1 | 1.5 | 1 | 0 | 4 | 5 | 5 | 5 | 5 | 4 | 5 | 5 | 5 | 5 |
| j) | 3 | 2 | 3 | 4 | 5 | 3 | 4 | 3 | 2 | 0 | 1 | 1 | 1 | 1 | 6 | 7 | 7 | 7 | 7 |
| k) | 5 | 4 | 7 | 5 | 7 | 7 | 6 | 5 | 6 | 1 | 0 | 2 | 2 | 3 | 9 | 8 | 10 | 10 | 11 |
| l) | 7 | 4 | 5 | 6 | 7 | 7 | 9 | 7 | 6 | 1 | 2 | 0 | 3 | 2 | 11 | 12 | 10 | 13 | 12 |
| m) | 7 | 5 | 7 | 4 | 5 | 4 | 4 | 4 | 5 | 1 | 2 | 3 | 0 | 2 | 11 | 12 | 10 | 13 | 12 |
| n) | 8 | 5 | 6 | 5 | 4 | 4 | 7 | 6 | 5 | 1 | 3 | 2 | 2 | 0 | 10 | 12 | 11 | 11 | 9 |
| o) | 3 | 2 | 3 | 4 | 5 | 3 | 4 | 3 | 2 | 6 | 7 | 7 | 7 | 7 | 0 | 1 | 1 | 1 | 1 |
| p) | 5 | 4 | 7 | 5 | 7 | 7 | 6 | 5 | 6 | 9 | 8 | 10 | 10 | 11 | 1 | 0 | 2 | 2 | 3 |
| q) | 7 | 4 | 5 | 6 | 7 | 7 | 9 | 7 | 6 | 11 | 12 | 10 | 13 | 12 | 1 | 2 | 0 | 3 | 2 |
| r) | 7 | 5 | 7 | 4 | 5 | 4 | 4 | 4 | 5 | 9 | 10 | 11 | 8 | 10 | 1 | 2 | 3 | 0 | 2 |
| s) | 8 | 5 | 6 | 5 | 4 | 4 | 7 | 6 | 5 | 10 | 12 | 11 | 11 | 9 | 1 | 3 | 2 | 2 | 0 |

In Table 1, a~s corresponds to the matching types shown in FIGS. 7A~8S and the number represents a distance. The matching type to be used in the template matching is selected in the order beginning from the shortest distance. As the same matching types has a distance of "0", the template matching is first performed using a same matching type. Accordingly, this matching method may be effective when there exists a high possibility that a previously motion continues in the same direction.

In the speed-estimation matching method, a certain face region among different faces appearing in frames during a time interval ($\Delta t$) between two defined frames is predicted to shift by as much as the maximum movable distance (d). Accordingly, if a certain face region has a moving speed of d/n between two frames having the time interval ($\Delta t$), the face region would be detected at a shifted position in a frame after a time period of $\Delta tx(n/2)$, and would be detected at an existing face region within the time period of $\Delta tx(n/2)$. As a result, the face region need not be detected for every frame, and performing an effective range template matching in a frame after a time period of $\Delta txn$ is sufficient. Namely, the frame after the time period of Δtxn will be the n-th frame. This matching method will be later explained in more detail with reference to FIG. 5.

Referring back to FIG. 4, after performing a template matching based upon the effective range, the detection system judges whether the template matching is successfully completed (step S406). If one of the face regions detected at step S405 is not successfully detected, the detection system returns to step S402 to detect the face region again. This situation may arise when a detected face appears for a while and does not appear thereafter. On the other hand, the detection system increases the count value (COUNT=COUNT+1) when all face regions are successfully detected (step S407), and processes the next image frame. That is, if the current frame is not the last frame (step S408), a next frame is input and processed from step S401.

According to the second embodiment of the present invention, the face region is periodically re-detected with respect to either the whole image frame or a newly appearing face region not yet detected through the effective range template matching. Because characters may frequently appear and/or leave, the face regions detected by the template matching based on the effective range would continuously change. Thus, the detection system should also detect the face region of newly appearing character in addition to that of the already detected character. As a result, an accurate and efficient detection of face regions appearing in a current input frame can be performed using the general algorithm such as the template matching method or the method using the image difference and skin color information, and then using the template matching based on the effective range with respect to the detected face regions.

Figure 5:
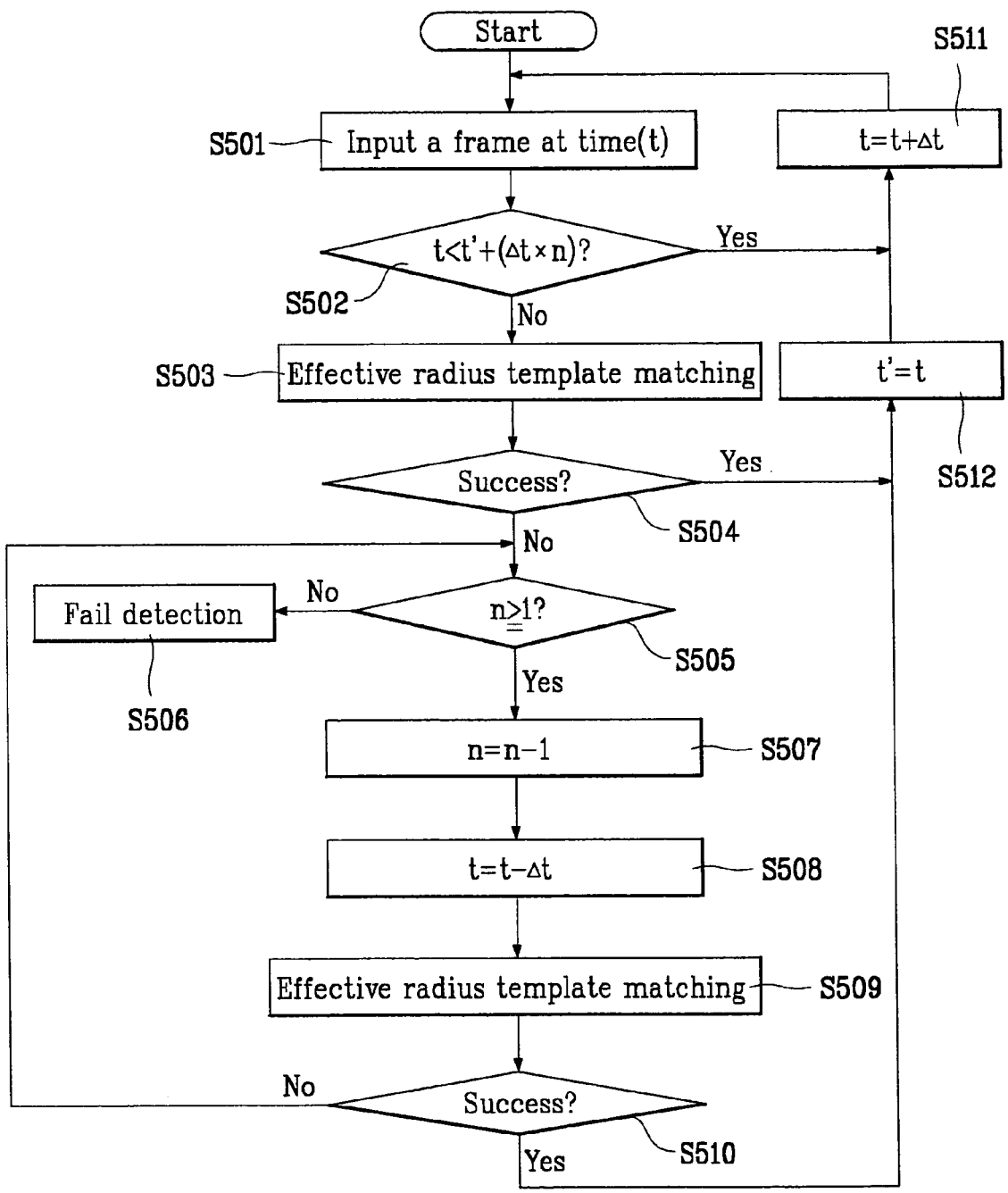
FIG. 5 is flowchart of a process of performing the template matching by adaptively accumulating to the moving speed of the object using the limited effective range and the interval between frames for detecting the specific object according to the second embodiment of the present invention.

FIG. 5 is a flowchart of a template matching process performed based upon the moving speed of an object, i.e. the speed-estimation matching method. Generally, a limited effective range and an interval between frames for detecting a face region are determined by a number of frames between the frames from which an object region would be detected. First, the detection system compares a current frame input at time (t) with a frame input at time (t'+(Δtxn)), where t' denotes a time of the frame in which a face region was previously detected and Δt denotes a predefined time interval (steps S501 and S502).

If the condition of t<{t'+(Δtxn)} is true, the detection system adds the time interval (Δt) to the time (t) of the current input frame (step S511). On the other hand, if the condition of t<{t'+(Δtxn)} is false, the detection system performs the template matching based on a limited effective range (step S503), and judges whether a face region detection is successfully performed by comparing the template matching point to a predetermined value (step S504).

If the template matching based on the effective range condition is successful, the detection system sets the time (t') corresponding to the frame in which a face region was previously detected as the time (t) corresponding to the current input frame (step S512), and adds the time interval (Δt) to the time (t) (step S511). Otherwise, if the template matching based on the effective range condition is not successful, the detection system compares and detects whether the number (n) exceeds "1" (step S505).

At this time, if the number (n) does not exceed "1," the template matching is assumed to have failed (step S506). However, if the number (n) exceeds "1," the detection system decreases the number (n) (step S507) and subtracts the time interval (Δt) from time (t) (step S508). Thus, a template matching of the frame at time (t−Δt) is performed (step S508).

The value of n denotes a frame interval mapped by a template when the frame was initially changed at a previous step, and the movement/scale appears in the frame after the time of Δtxn. Specifically, even if a motion of the face is not continuous, the face may appear over an effective radius of a frame in which a face was detected, i.e. after the time of Δtxn. As shown in FIGS. 7A to 7I and 8J to 8S, since all 19 types of matching does not result in a score which exceeds the threshold value, the detection system performs an effective radius template matching until the detection of the face region from a frame of Δtx(n−1 to a frame of Δt succeeds. Here, the template matching may be performed using several predefined types of matching rather than all 19 matching types, thereby increasing the efficiency of face detection.

Accordingly, the detection system performs the template matching based on a face region previously detected and determines a template region with a highest score as the face region; determines the matching type order based on the type of template matching used at the previous step and performs a search in the determined order, or selects a frame to be template-matched based upon a recent moving speed of the face without having to perform a template matching for every frame. Thus, the detection system may track a face once detected even as time goes by, and periodically detect a face region of a new character.

As described above, according to the second embodiment of the present invention, the final detection object can be efficiently and accurately detected by initially detecting the object from the whole image region using a general detection algorithm, and then performing a template matching based on the effective range condition.

In another embodiment of the present invention, color is extensively utilized to detect an object. A typical application field for specifying a color range of the specific object to be detected is in the field for searching a face or hand by specifying the skin color. In the related art, a method specifies a skin color region by converting the color space of RGB into a color space of YIQ and detects the region of hand accordingly. Another method in the related art converts the skin color range in L*a*b color space using the principle component analysis and detects the skin color region using the converted skin color range. Still, another method in the related art calculates the possibility that a specific color is the skin color using a fuzzy set.

Therefore, the skin color range in the related art as described above are predefined. However, a same object may appear with a quite different color depending upon circumstances such as illumination, picture device and/or a display. As a result, it may be difficult to predefine the full color range of a specific object. In other words, specifying a color range to cover all circumstances would make the color range too wide, and when detecting a specific object, an unwanted color region may satisfy the detection condition.

Figure 9:
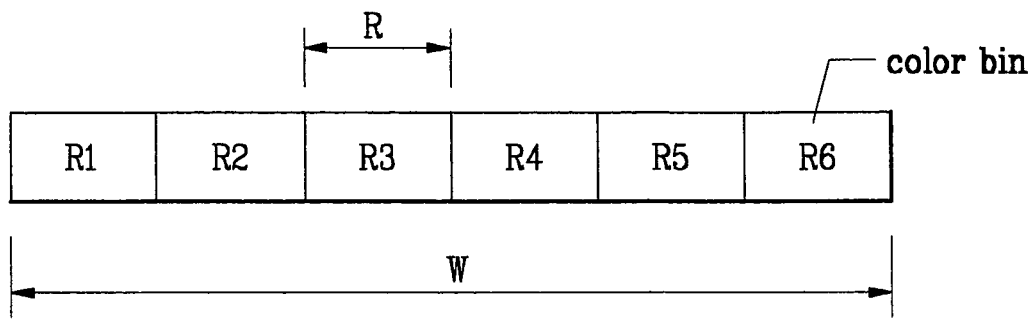
FIG. 9 is a view of an object detection process using a multilevel color range according to a third embodiment of the present invention.
Figure 10:
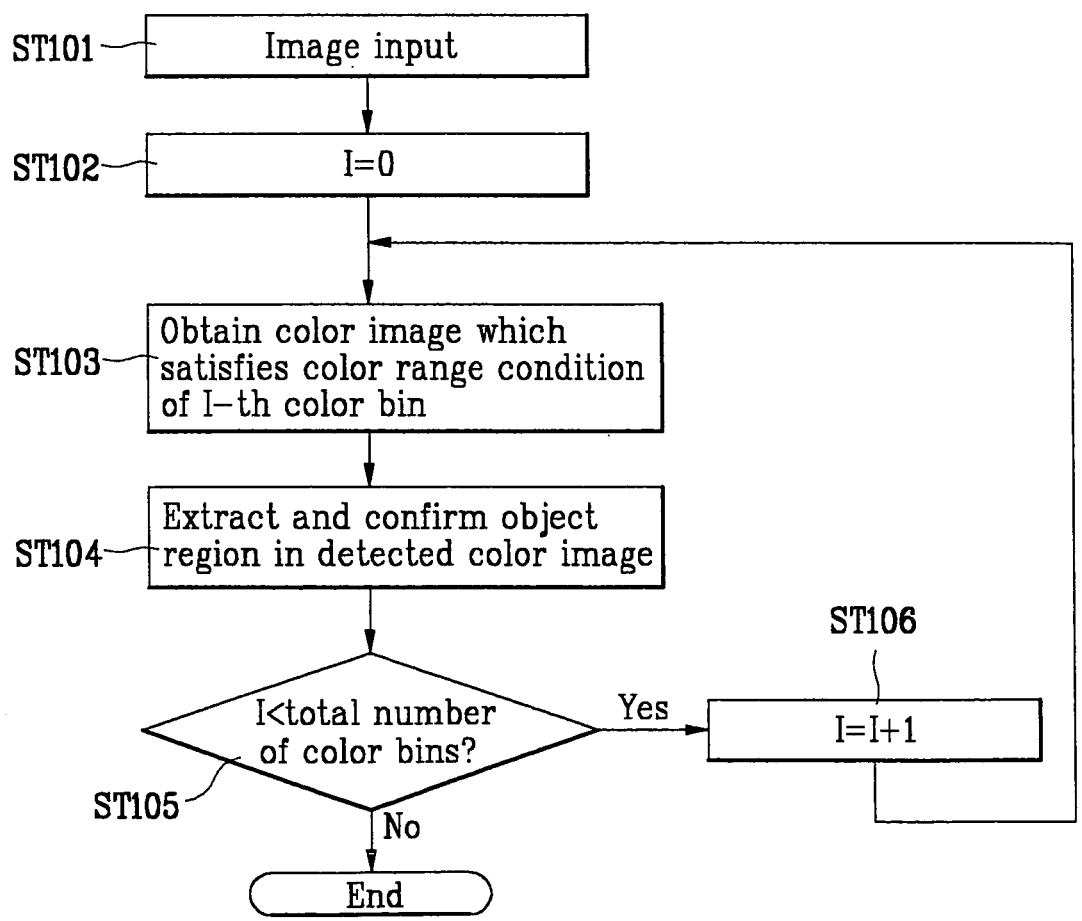
FIG. 10 is a flowchart of the object detection process according to a third embodiment of the present invention.

FIG. 10 is a flowchart of an object detection process according to a third embodiment of the present invention. Referring to FIG. 10, when detecting the specific object from an input image frame, the detection system divides the full color range (W) of an object to be detected into a plurality of sections, R1 to R6 as shown in FIG. 9 (step ST101). The system obtains a color image by detecting colors of the input frame which satisfies a color range condition of the first color bin R1, i.e. a I-th color bin (steps ST102 and ST103). Thereafter, the detection system detects the object from the obtained color image and confirms the object using a general confirmation algorithm (step ST104). The detection system then compares and identifies whether the current section is the last color bin, i.e. section R6 (step ST105). If the current section level is the last level, the detection system terminates the process. Otherwise, the detection system increases a count value and returns to step ST103 (step ST106).

In the above embodiment, the range (R) of each section can be determined by a statistical range which represents a size of the color range of the object to be detected in an image or frame. The statistical range may be obtained in advance using an image testing set. Assuming that a statistical range is 'r,' the relation with the range 'R' is given by R>r. By determining the color range R of the divided sections with respect to the whole color range to be larger than the statistical range r of the object to be detected, the detection system obtains a color image including at least the object to be detected. Thus, the detection system can then detect the specific object through the template matching.

Furthermore, in the above embodiment, the full color range was divided into six color bins R1 to R6 as shown in FIG. 9. However, the full color range may be divided into more or less color bins as necessary. Also, a brightness component is used as the basis for dividing the full color range (W). Accordingly, when detecting the face region by using the color of the face region, the relative brightness of the skin color can be considered, and the accurate and effective detection of the object region is possible.

Figure 11A:
FIG. 11A is a view illustrating the object detection state for the color range of an object according to the third embodiment of the present invention.
Figure 11B:
FIGS. 11B and 11C are views illustrating the object region detection state according to a limited color range which is bisected from the whole color range of the object according to the third embodiment of the present invention.
Figure 11C:
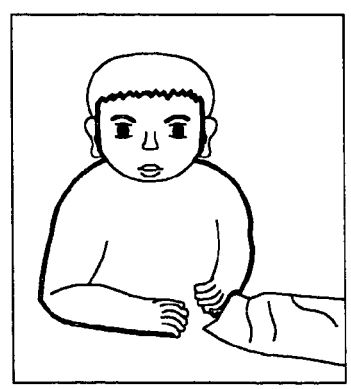

For example, if the object to be detected is a human face, FIG. 11A illustrates a detected object region using the full color range (W) of the object such as a skin color according to the third embodiment of the present invention. FIGS. 11B and 11C are views illustrating the detected object regions using divided color ranges (R) of the full color range (W) of the object. When detecting the object using the full color range as shown in FIG. 11A, portions other than the skin color region such as a blanket is included. However, when a limited color ranges (R) are used, non-skin color portions is detected in one color image as shown in FIG. 11B and the skin color regions is detected in another color image as shown in FIG. 11C.

Figure 12:
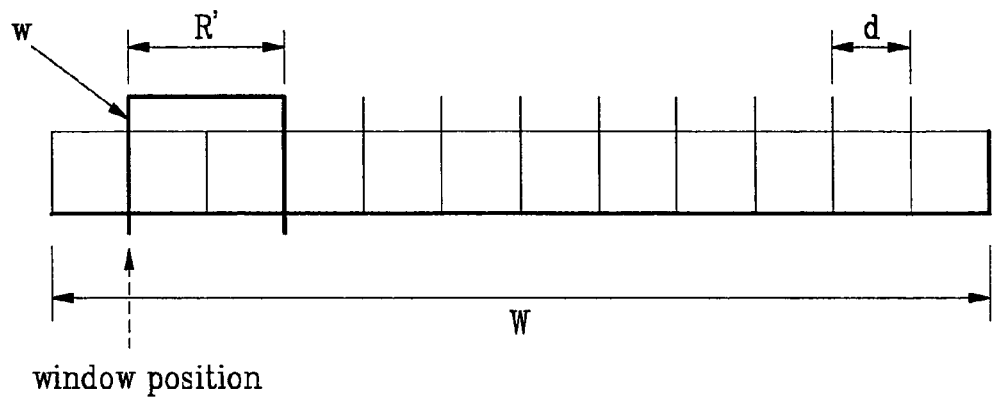
FIG. 12 is a view of an object detection process using the multilevel color range according to a fourth embodiment of the present invention.

FIG. 12 illustrates an object detection process using a multilevel color range according to a fourth embodiment of the present invention. In this embodiment, the detection system divides the full color range (W) of the object to be detected into a plurality of color ranges, determines the color range of the object by shifting a window (R') by a distance (d), and detects the detection object according to the determined color range condition.

Figure 13:
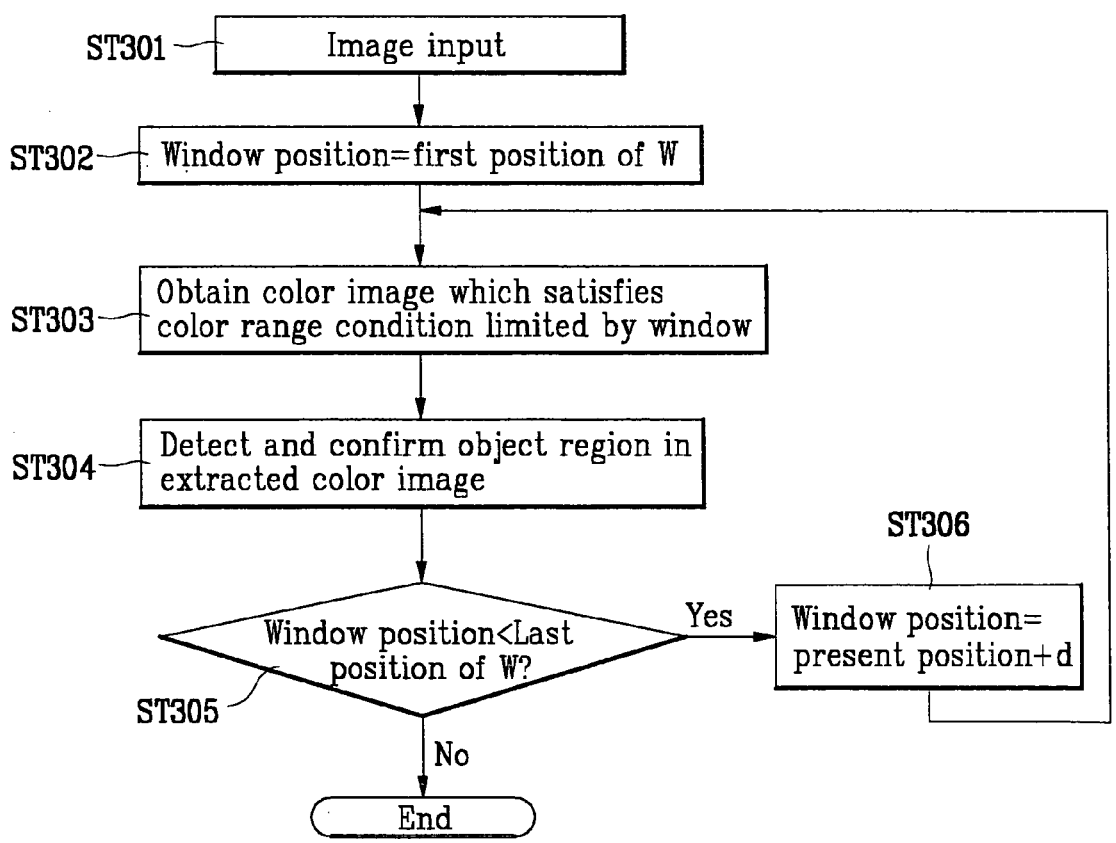
FIG. 13 is a flowchart of a specific object detection process according to the fourth embodiment of the present invention.

FIG. 13 is a flowchart of the specific object detection process according to the fourth embodiment of the present invention. Referring to FIG. 13, the detection system receives an input image (step ST301), and judges whether the present position of the window is the first position of the divided color ranges (step ST302). If the window position is the first position, the detection system obtains a candidate color image by detecting colors of the input image or frame which satisfies the color range condition limited by a window (R') that defines the color range (w) (step ST303).

Thereafter, the detection system detects the object region from the detected color image, and confirms the region using a general detection algorithm (ST304). If the present window position does not exceed the last position of the full color range (W), the detection system then obtains another candidate color image including colors of the image or frame which satisfies the color range condition limited by a window (R') at a position shifted with distance (d) (steps ST305 and ST306). However, if the present window position corresponds to the last position of the full color range (W), the detection system terminates the detection operation.

In the above embodiment, the detection system detects the object region by a template matching with respect to the detected candidate color image and confirms the detected object region if the template matching point exceeds a predetermined threshold value. Also, as in the third embodiment of the present invention, the size of the window (R') is determined by a statistical range (r) using an image training set, and their relation is given by R'>r. In addition, the movement distance (d) is half of the window size (R'), d=R'/2.

Moreover, when detecting a specific object or a partial region of the object according to both the third and fourth embodiments of the present invention, the full color range of the detection object is determined, the section of the color range of a predetermined size is determined from the full color range, and the object is detected using a color image within the determined section. Namely, if the divided color range section (R) is determined to be the same as the size of the window (R'), and the movement distance (d) of the window (R') is determined to be the same as the size of the window (R'), the detection method according to the third or fourth embodiment of the present invention will obtain same candidate color images and detect same object regions. However, in the third and fourth embodiments of the present invention, the relation is preferably determined to be R'>R>r to effectively detect the object region.

Also, in the third embodiment of the present invention, the number (Cn1) of color images obtained using the divided ranges may be represented by Cn1=int(W/R). In the fourth embodiment of the present invention, the number (Cn2) of color images obtained using the limited ranges may be represented by Cn2=int[2×(W/R')]−1=int[2×(W/d)]−1. Here, int[] is an integer obtained from the given value using the round-off rule. As a result, the method of the third embodiment of the present invention can detect the object region more quickly than the method of the window shifting according to the fourth embodiment of the present invention. However, according to the method of the third embodiment, the object region may be difficult to detect accurately if the object region overlies between the divided sections. Accordingly, in the fourth embodiment of the present invention, the movement distance (d) of the window (R') is determined in consideration of this problem.

The third and fourth embodiments of the present invention as described above can be properly applied to the object detection when a plurality of object region need to be detected. However, when only one object region is to be detected, obtaining the candidate color image from a corresponding full color range and then detecting the object region through the template matching may be more efficient. This is because obtaining the candidate color image of the object region and then template matching the candidate color image are not required with respect to the whole image or frame after the object region is detected.

Moreover, the detection speed may be improved if the object region is detected by performing the template matching in a predetermined order. Specifically, when detecting the object region by performing the template matching with respect to the image detected using the divided color range according to the third and fourth embodiments of the present invention, the order of detecting an object region from a candidate color image is predetermined by probability values assigned to each color range, where the probability indicates the likelihood that a range includes the color of the object to be detected. Thus, the speed of the object region detection can be improved. For instance, if the probability value of color range R4 is the highest in the third embodiment, the above-described process is not performed from R1, but the candidate color image is obtained first using the color range of R4, and then the object region is detected by performing the template matching. Here, the probability values of the color ranges can be obtained by using the distribution of the color ranges which includes the color of the actual detected object using data obtained through a test.

Finally, in detecting the object region according to the third and fourth embodiments of the present invention, the object detection can be effectively performed using the color feature of the object having the same relative brightness as the detection object.

Figure 14:
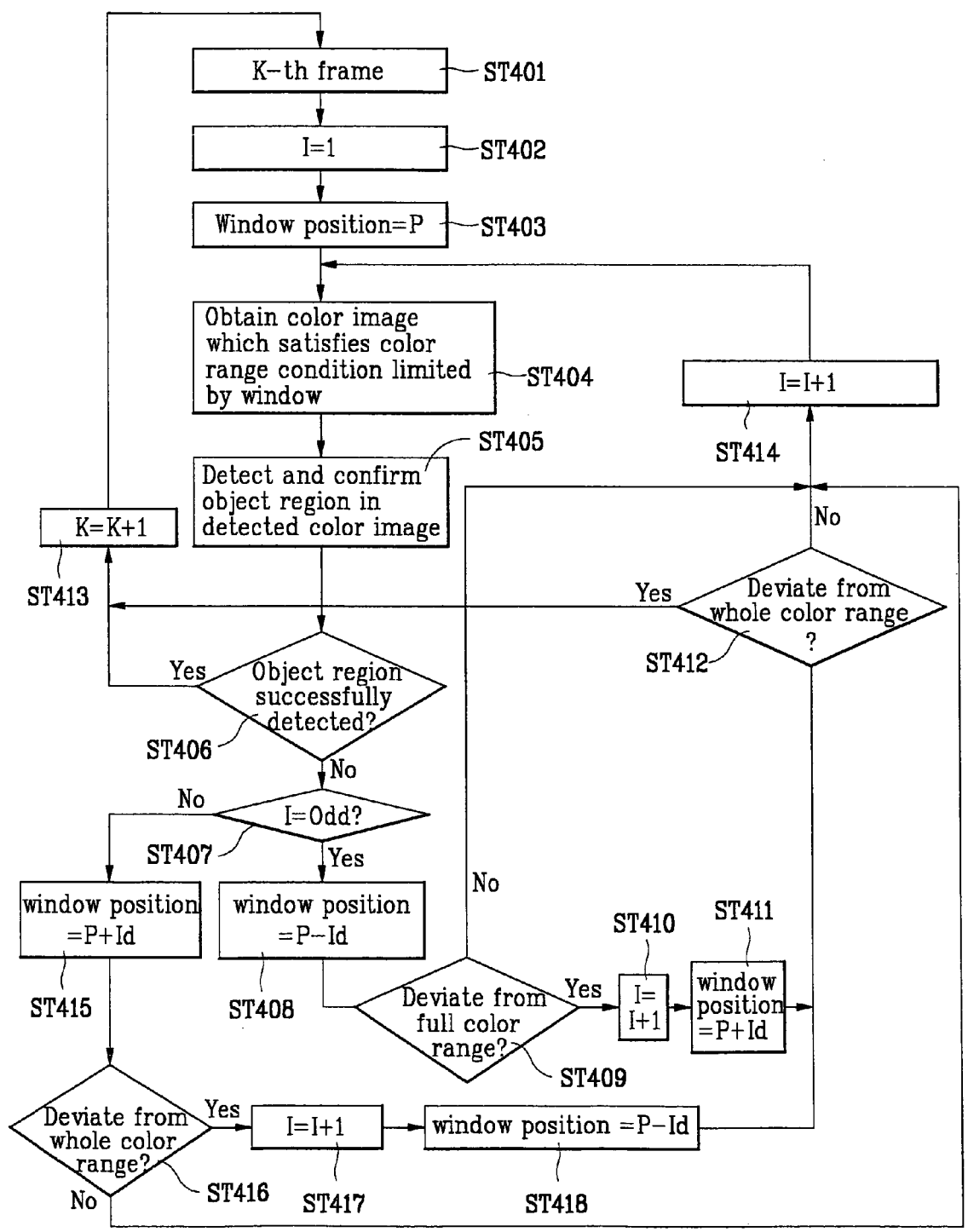
FIG. 14 is a flowchart of a specific object detection process in a moving image according to the fourth embodiment of the present invention.

FIG. 14 is a flowchart illustrating the specific object detection process according to the fourth embodiment of the present invention. Referring to FIG. 14, assuming that the input image signal is a moving image signal and assuming the position of a window from which an object region was detected in the previous image frame (K−1) is P, the detection system shifts the window position to the position (P) when the present frame (K) is input and a variable I is set to a value of "1" for the control of the window shift (steps ST401 to ST403). Because the object region is deemed to be similar in the present and previous frames, i.e. the adjacent frames do not represent a great change due to the characteristic of the moving image, the probability that a color range in which an object region was included at the previous frame should still apply for the present frame is judged to be high.

Thereafter, the detection system obtains the candidate color image for colors of the input image signal which satisfies the color range condition limited by the window (R') (step ST404). The detection system then detects the object region from the color image, and confirms the detected region as described above in reference to FIG. 13 (step ST405). Subsequently, the detection system judges whether the object region detection has been successful (step ST406). If the object region detection has been successful, the detection system performs the object region detection of the next frame (K+1) (step ST413).

However, if the object region detection has failed, the detection system judges whether the current value of I corresponds to an odd number (step ST407). If the variable I does not correspond to an odd number, the detection system shifts the window position to a position (P+Ixd) (step ST415) If the window position corresponds to the odd number, the detection system shifts the window position to a position (P−Ixd) (step ST408). Afterwards, the detection system judges whether the position of the shifted window deviates from the full color range (W) (steps ST409 and ST416).

At this time, if the position of the shifted window deviates from the full color range, the detection system first increases the variable value I by "1" (steps ST410 and ST417) and respectively shifts the window position to (P+Ixd) or (P−Ixd) (steps ST411 and ST418). After shifting the window, if the position of the shifted window still deviates from the full color range, the detection system judges that the object region detection in the present frame has failed and proceeds to detect the object region in the next frame (K+1) (step ST412). However, if the position of the shifted window does not deviate from the full color range, the detection system increases the value of the variable by one unit (step ST414) and proceeds to step ST404 to obtain the candidate color image for colors of the input image signal which satisfies the color range condition limited by the window (R').

As described above, if the specific object detection method in an image signal according to the present invention is applied to a moving picture search system or a security system using a face recognition, the detection object can be more accurately and efficiently detected in comparison to the existing detection methods. Also, the present invention can be applied to the fields which require an on-line face region detection through video cameras.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of detecting a specific object in an image signal comprising:
    detecting an initial object region from an input image using a general detection algorithm if an object region has not been detected in a previous input image; and
    detecting an object region from an input image by a template matching based upon an effective range if an object region was detected in a previous input image.

2. The method of claim 1, wherein detecting an initial object region from an input image using a general detection algorithm comprises detecting the initial object region by either a template matching method using a current input image, or a method using an image difference and color information.

3. The method of claim 1, wherein detecting an object region from an input image by a template matching based upon an effective range comprises defining the effective range as an estimated range where an object region may appear in a next input image.

4. The method of claim 1, wherein detecting an object region from an input image by a template matching based upon an effective range comprises performing the template matching by at least one of a whole matching method based on template matchings in predetermined positions, a motion estimation matching method based on a motion of an object, and a speed estimation matching method based on a relative speed difference of object motion appearing in the input images during a defined time interval (Δt).

5. The method of claim 4, wherein the template matching in the whole matching method may be either a shift matching, a scale matching or a combination of both the shift matching and the scale matching.

6. The method of claim 5, wherein the shift matching is one of either a four-directional matching or an eight-directional matching, and the scale matching is one of either an enlarged matching or a reduced matching.

7. The method of claim 4, wherein the motion matching method comprises:
    determining a highest probability of an object movement in consideration of an object movement in a previous input image;
    template matching in an order from a type of matching with the highest to lowest probability of having an object movement; and
    terminating the template matching upon obtaining a result of a template matching which meets a predetermined threshold value.

8. The method of claim 4, wherein in the step of detecting an object region from an input image by a template matching based upon an effective range, the speed estimation matching method comprises:
predicting a shift of an object region during the defined time interval ($\Delta t$) between an n-th input image and an input image in which an object region has been detected;
skipping the input frames between the n-th input image and the input image in which an object region has been detected; and
detecting an object region at a shifted position in the n-th input image after a time period of $\Delta t \times n$.

9. A method of detecting a specific object in an image signal comprising:
dividing a full color range of the specific object into a plurality of sections, where each section includes a portion of the full color range;
obtaining a color image by detecting colors of the image which satisfy a limited color range of at least one section; and
detecting the object from the obtained color image, wherein obtaining a color image by detecting colors of the image which satisfy a limited color range of at least one section comprises obtaining color images by defining a window which includes at least one section, shifting the window by a predetermined distance, and detecting colors of the image which satisfy a color range limited by each shifting of the window.

10. The method of claim 9, further comprising confirming the detected object using a general detection algorithm.

11. The method of claim 9, wherein dividing a full color range of the specific object into a plurality of sections comprises determining the limited color range of each section by a statistical range which represents a size of the color range of the object to be detected in an image.

12. The method of claim 9, wherein dividing a full color range of the specific object into a plurality of sections comprises dividing the full color range into the plurality of sections based upon a brightness component.

13. The method of claim 9, wherein shifting the window from a present position to a next position by the predetermined distance equivalent to half the window size.

14. The method of claim 9, wherein detecting the object from the obtained color image comprises detecting the object in an order from a color image corresponding to a limited color range with a highest to lowest probability of including the color of the object.

15. A method of detecting a specific object in an image signal, comprising:
judging whether a current input image frame is a first image frame;
detecting an initial object region from the current input image frame using a general detection algorithm if the current input image frame is the first input image frame; and
detecting an object region from an input image frame by a template matching based upon an effective range if the current input image frame is not the first input image frame.

16. The method of claim 15, wherein detecting an initial object region from the current input image frame using a general detection algorithm comprises detecting the initial object region by either a template matching method using the current input image frame, or a method using an image difference and color information.

17. The method of claim 15, wherein detecting an object region from the current input image frame by a template matching based upon an effective range composes defining the effective range as an estimated range where an object region may appear in a next input image frame.

18. The method of claim 15, wherein detecting an object region from the current input image frame by a template matching based upon an effective range comprises performing the template matching by at least one of a whole matching method based on template matchings in predetermined positions, a motion estimation matching method based on a motion of an object, and a speed estimation matching method based on a relative speed difference of object motion appearing in the input images during a defined time interval ($\Delta t$).

19. The method of claim 18, wherein the template matching in the whole matching method may be either a shift matching, a scale matching, or a combination of both the shift matching and the scale matching.

20. The method of claim 19, wherein the shift matching is one of either a four-directional matching or an eight-directional matching, and the scale matching is one of either an enlarged matching or a reduced matching.

21. The method of claim 18, wherein the motion matching method comprises:
determining a highest probability of an object movement in consideration of an object movement in a previous input image frame;
template matching in an order from a type of matching with the highest to lowest probability of having an object movement; and
terminating the template matching upon obtaining a result of a template matching which meets a predetermined threshold value.

22. The method of claim 18, wherein, in the step of detecting an object region from the current input image frame by a template matching based upon an effective range, the speed estimation matching method comprises:
predicting a shift of an object region during the defined time interval ($\Delta t$) between an n-th input image frame and an input image frame in which an object region has been detected;
skipping the input frames between the n-th input image and the input image frame in which an object region has been detected; and
detecting an object region at a shifted position in the n-th input image frame after a time period of $\Delta t \times n$.

23. A method of detecting a specific object in an image signal, comprising:
detecting an initial object region from an input image using a general detection algorithm if an object region has not been detected in a previous input image; and
detecting an object region from an input image by a template matching based upon an effective range if an object region was detected in a previous input image, wherein detecting an object region from an input image by a template matching based upon an effective range comprises performing the template matching by at least one of a whole matching method based on template matchings in predetermined positions, a motion estimation matching method based on a motion of an object, and a speed estimation matching method based on a relative speed difference of object motion appearing in the input images during a defined time interval ($\Delta t$), and wherein the motion matching method comprises:

determining a highest probability of an object movement in consideration of an object movement in a previous input image;

template matching in an order from a type of matching with the highest to lowest probability of having an object movement; and terminating the template matching upon obtaining a result of a template matching which meets a predetermined threshold value.

24. A method of detecting a specific object in an image signal, comprising:

detecting an initial object region from an input image using a general detection algorithm if an object region has not been detected in a previous input image; and detecting an object region from an input image by a template matching based upon an effective range if an object region was detected in a previous input image, wherein detecting an object region from an input image by a template matching based upon an effective range comprises performing the template matching by at least one of a whole matching method based on template matchings in predetermined positions, a motion estimation matching method based on a motion of an object, and a speed estimation matching method based on a relative speed difference of object motion appearing in the input images during a defined time interval ($\Delta t$), and wherein the speed estimation matching method comprises:

predicting a shift of an object region during the defined time interval ($\Delta t$) between an n-th input image and an input image in which an object region has been detected;

skipping the input frames between the n-th input image and the input image in which an object region has been detected; and detecting an object region at a shifted position in the n-th input image after a time period of $\Delta t \times n$.

* * * * *